United States Patent [19]

Izawa

[11] Patent Number: 4,751,413
[45] Date of Patent: Jun. 14, 1988

[54] SOLAR ENERGY MOTOR

[75] Inventor: Hideo Izawa, Nara, Japan

[73] Assignee: Sharp Kabushiki Kaisha, Osaka, Japan

[21] Appl. No.: 850,599

[22] Filed: Apr. 11, 1986

[30] Foreign Application Priority Data

May 15, 1985 [JP] Japan .............................. 60-71694[U]

[51] Int. Cl.$^4$ ..................... H01L 25/00; H02K 19/36; G09F 13/34
[52] U.S. Cl. .................................. 310/68 D; 136/291; 310/46; 310/89
[58] Field of Search ............ 310/40 MM, 68 D, 75 R, 310/89, 114; 363/126; 136/291, 293; 320/61, 64; 322/86

[56] References Cited

U.S. PATENT DOCUMENTS

| 3,353,191 | 11/1967 | Dahly | 310/40 MM |
| 4,328,417 | 5/1982 | Himes | 310/46 |
| 4,333,262 | 6/1982 | Kimura | 136/291 |
| 4,482,827 | 11/1984 | Baldwin | 310/68 D |
| 4,596,083 | 6/1986 | Thompson | 136/291 |

Primary Examiner—Patrick R. Salce
Assistant Examiner—D. L. Rebsch

[57] ABSTRACT

A solar energy motor comprises a plurality of photovoltaic elements, such as solar cells, and armature coils unistructurally secured to a rotatable axis. The photovoltaic elements and the armature coils are electrically connected such that DC electromotive forces generated sequentially in the photovoltaic elements on which light beams are made incident are applied to the armature coils. Currents thus generated in the armature coils produce a torque in the presence of magnets.

3 Claims, 1 Drawing Sheet

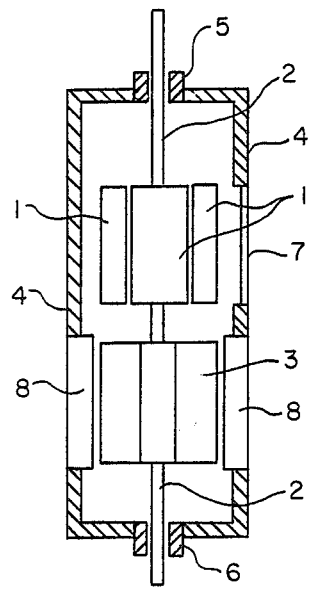
FIG. —1
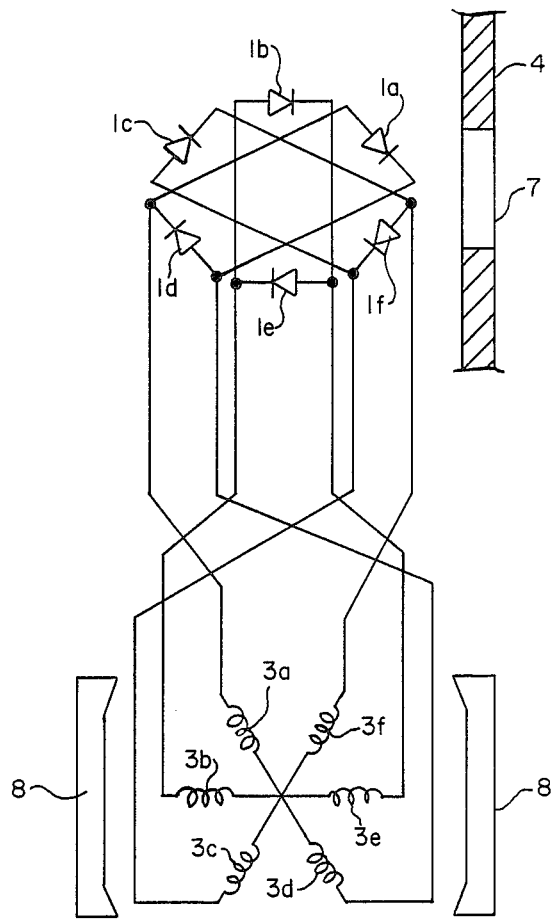
FIG. —2

SOLAR ENERGY MOTOR

This invention relates to a solar energy motor which converts light energy into rotational kinetic energy.

In the past, rotational kinetic energy was obtained from light energy by first generating DC power by a solar cell or the like and then supplying this DC power directly to a DC motor. This method of converting light energy into rotational kinetic energy has the following problems. Firstly, a DC motor requires a commutator and brushes for switching currents in the armature coils but the sparks generated between the commutator and the brushes cause electric noise. Secondly, the brushes wear out and must be replaced periodically. This gives rise to a maintenance problem. Thirdly, a large current is required at the time of startup because of the frictional force on the brushes. This requires the circuit rating to be increased. Fourthly, the apparatus becomes large because solar cells must be separately connected to the DC motor.

It is therefore an object of the present invention to provide a solar energy motor which comprises photovoltaic elements and obviates the need for a brush structure.

The above and other objects of the present invention are attained by providing a solar energy motor comprising photovoltaic elements which are rotatable as a single unit with armature coils. DC voltages generated in these photovoltaic elements when irradiated by light are applied to the armature coils to generate rotational power.

The accompanying drawings, which are incorporated in and form a part of the specification, illustrate in embodiment of the present invention and, together with the description, serve to explain the principles of the invention. In the drawings:

FIG. 1 is a schematic sectional view of a solar energy motor embodying this invention, and FIG. 2 is a schematic circuit diagram of a motor of the present invention.

As shown in FIG. 1, a solar energy motor according to one embodiment of the present invention comprises a plurality of photovoltaic elements 1, such as solar cells, which are secured symmetrically around a rotary axis 2, such that an approximately cylindrical shape is formed as a whole. The light-receiving surfaces of the individual photovoltaic elements 1 form the peripheral surface of this cylindrical shape around the axis 2 to which armature coils 3 are secured, as well as the photovoltaic elements 1. The armature coils 3 and the photovoltaic elements 1 are electrically connected, as will be explained below. The axis 2 is rotatably supported at bearing parts 5 and 6 by the housing 4 such that the photovoltaic elements 1 can freely rotate as a single unit with the armature coils 3. The housing 4 is provided with a window 7 made of a transparent material opposite to one of the photovoltaic elements 1. Magnets 8 are disposed on the housing 4, facing the armature coils 3.

The circuit structure of the solar energy motor described above is conceptually shown in FIG. 2, wherein six photovoltaic elements 1a, 1b, ... 1f compose what was identified as "photovoltaic elements 1" in connection with FIG. 1, and six armature coils 3a 3b, ... 3f similarly compose what was identified as "armature coils 3" in connection with FIG. 1. As shown in FIG. 2, two photovoltaic elements 1a and 1d connected in antiparallel relationship to each other are connected to armature coils 3a and 3d, which are connected to each other in series. Similarly, photovoltaic elements 1b and 1e are connected to armature coils 3b and 3e and photovoltaic elements 1c and 1f are connected to armature coils 3c and 3f.

When a light beam is incident through the window 7 on the photovoltaic element 1a, an electromotive force is generated in this element and the voltage thus generated is applied to the armature coils 3a and 3d, causing a current to flow therethrough and imparting a torque on the armature coils 3 by the attractive and repulsive forces between the magnetic fields generated in these coils 3a and 3d and the magnets 8. When the armature coils 3, and hence the photovoltaic elements 1, begin to rotate in the clockwise direction with reference to FIG. 2, the photovoltaic cell 1b becomes irradiated next by the light beam incident through the window 7, causing a current to flow through the armature coils 3b and 3e and generating a torque again by the attractive and repulsive forces between the magnetic fields in the coils 3b and 3e and the magnets 8. Thus, as the light beam is made incident sequentially on the photovoltaic elements 1a, 1b, ..., 1f, a current flows correspondingly in the armature coils 3a, 3b, ... 3f such that a torque is generated continuously around the axis 2. The magnitude of the torque can be controlled by varying the intensity of the light beam incident on the photovoltaic elements 1 through the window 7.

In summary, light is made incident on photovoltaic elements which are freely rotatable around an axis as a single unit with armature coils such that the electromotive forces generated in these photovoltaic elements are applied to the armature coils. Light energy is thus converted into rotational kinetic energy without the need for brushes, and this serves to eliminate not only the electrical noise which is a characteristic of a DC motor, but also frictional resistance by the brushes. The absence of brushes further makes the maintenance of the motor easier and, since the motor can be built unistructurally with the photovoltaic elements, the motor can be made compact and easy to handle.

The foregoing description of a preferred embodiment of this invention has been presented for purposes of illustration and description. It is not intended to be exhaustive or to limit the invention to the precise form disclosed, and obviously many modifications and variations are possible in light of the above teaching. For example, the number of photovoltaic elements used in the motor is not intended to limit the scope of the invention. FIG. 1 is intended to be a schematic drawing and not to present preferred dimensional relationships among the components. The name "solar energy motor" was tentatively used, and light energy to be converted into rotational kinetic energy need not originate from the sun. The embodiment was chosen and described in order to best explain the principles of the invention. Such modifications and variations which may be apparent to a person skilled in the art are included within the scope of this invention.

What is claimed is:

1. A solar energy motor comprising
   a housing with a window,
   an axis rotatably supported by said housing,
   a plurality of photovoltaic elements symmetrically mounted on and around said axis, said elements being adapted to be sequentially exposed to external light through said window one at a time,
   means to provide a magnetic field, and armature coils disposed in said magnetic field, said armature coils being individually associated with said photovoltaic elements and mounted on said axis so as to rotate together with said photovoltaic elements.

2. The motor of claim 1 wherein light-receiving surfaces of said photovoltaic elements form a cylindrical peripheral surface.

3. The motor of claim 1 wherein each pair of said photovoltaic elements disposed diagonally opposite from each other with respect to said axis are electrically connected in antiparallel relationship to each other and to a corresponding pair of said armature coils, said corresponding pair of armature coils being connected to each other in series.

* * * * *